INVENTOR.
WILLIAM E. SCHWABE
BY Herbert J. Evers
ATTORNEY

United States Patent Office 2,909,422
Patented Oct. 20, 1959

2,909,422

METHOD OF IMPROVING THE QUALITY AND PRODUCTIVITY OF ELECTRIC ARC FURNACE STEEL

William E. Schwabe, Niagara Falls, N.Y., assignor to Union Carbide Corporation, a corporation of New York Application July 2, 1957, Serial No. 669,583

3 Claims. (Cl. 75—10)

This invention relates to a method of improving the quality of product from and productivity of electric arc furnaces, and concerns improved means of controlling and stabilizing an electric arc.

In the manufacture of electric furnace steel, one of the major problems is improvement in the stability of the arc which occurs between the end of the carbonaceous electrode and the metal being melted. Normally the furnace arc is subjected to erratic dislocations during the melt-down period of a furnace charge, moving around the end of the electrode, flashing over to one side, and alternately lengthening and shortening the arc. Frequently the arc drifts to one side of the electrode to such an extent that it becomes extinguished. These changes in arc length change the arc resistance, causing rapid fluctuations and swings in arc voltage, arc current and arc power, and incur added equipment expenses and increased power costs due to unsteady loads upon the power network. In addition, lighting systems that are connected to the same source of power as the furnace arc may be subjected to objectionable lighting flicker, particularly during the melt-down period of furnace operations.

Another difficulty in the arcing that occurs between the electrode and the melt involves the amount and rate at which energy is supplied by the arc. A short arc having a low resistivity supplies less heat energy than a longer arc. Because of this relationship between arc length and supply of heat energy, a short arc can be a disadvantage when it is desired to supply increased power to the arc. On the other hand, too long an arc may also be undesirable, since long arcs are known to be inefficient and the radiation effects associated with long arcs accelerate deterioration of the refractory material of the furnace particularly the furnace roof. Optimum arc length, therefore, depends in large measure upon the power needs for a particular condition in the furnace, and may vary just as the power requirements change as the melting and refining treatment progresses.

Experience has shown that a convenient way of achieving some degree of control or stability over the electrode arc characteristics is to provide a hollow electrode of the type disclosed in the patent to H. V. Johnson, 2,744,945, dated May 8, 1956. However, while this hollow electrode is effective for many purposes in achieving some degree of arc stability, it is inadequate under certain conditions where control over the electrode arc to fit a particular energy requirement may be desired. For example, the type of arc which may be desirable during the melt-down period of a furnace charge when high concentrations of heat energy are required is different from the arc which will fulfill the energy requirements for refining the melted charge. The difficulty up to now has been to control the arc characteristics, in order to relate them to the desired power input to the furnace, and to change the power input in conformity with the furnace requirements.

Still another difficulty with hollow electrodes arises from the updraft which occurs in the longitudinal bore. This results in oxidation of the electrode, and an increased rate of electrode consumption.

Another problem concerns the equipment required to stir the melt during the refining period. Frequently induction coils are used for this purpose, but they are costly and involve large capital expenditures.

Yet another difficulty involves the hydrogen pickup in the melt, which affects the quality of the furnace product. The application of an inert gas blanket over melt or the bubbling of an inert gas through the melt will often reduce the hydrogen content to a tolerable level. But because of the large volume of gas required, it represents an added cost which may be a handicap in some competitive situations.

It is, therefore, an important object of the present invention to provide a method and means for controlling the arc characteristics of a hollow furnace electrode and substantially reducing the melt-down and/or refining period of a metal charge.

Another object is to provide a method of improving and controlling the arc stability of a hollow electrode in order to substantially reduce the surges in power loads, and to consequently reduce the lighting flicker caused by electrode arcing to unobjectionable levels.

Another object of the present invention is to provide a method of decreasing the consumption rate of hollow electrodes.

Another object is to provide in the operation of a hollow electrode, an improved method of minimizing the updraft in said hollow electrode, and controllably changing the arc characteristics of said electrode, the method comprising introducing through the hollow of said electrode, arc-modifying materials, which are substantially inert to the electrode.

Another object of the invention is to increase the productivity of a hollow electrode furnace by means of a dual functioning hollow electrode through which a flow of arc-modifying material substantially stabilizes the arc length during the melt-down period of furnace operation, and the continued flow of material causes a stirring action in the melt region in the vicinity of the electrode during the refining period.

Another object of the present invention is to provide a simple and economical method of improving the quality of the metal product of an electric furnace.

Figure 1:
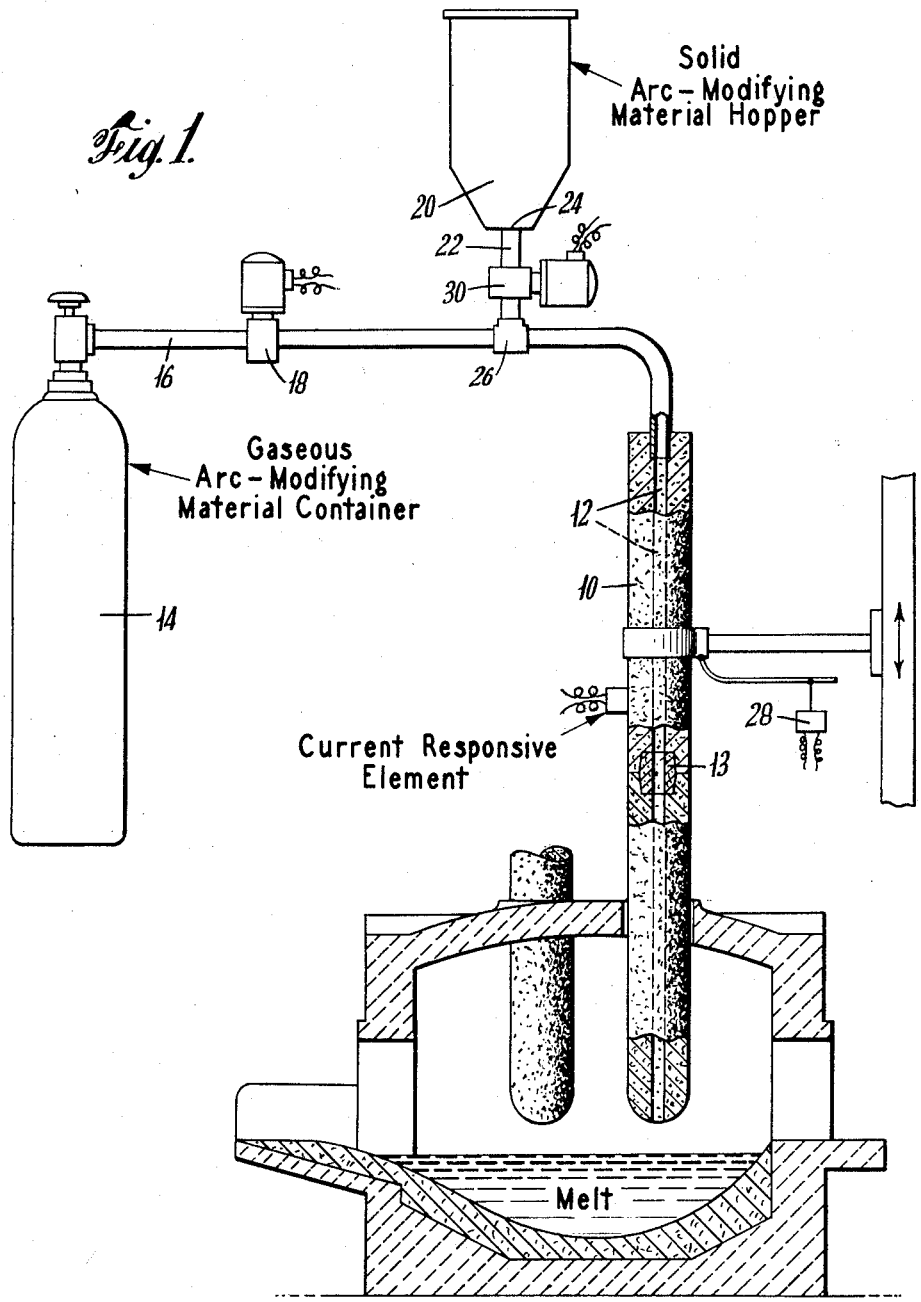
Fig. 1 shows a longitudinal sectional view of an exemplary hollow carbonaceous electrode illustrating the principles and novel features of the invention.

According to the present invention, means are provided for controlling the arc stability of a hollow carbonaceous electrode to the extent that suitable and fairly constant arc lengths may be developed between the electrode and furnace material, the length of arc being adjustably controlled in accordance with the power requirements of the furnace. As a means for accomplishing this, the bore of the electrode is supplied with a stream of gas such as argon, and arc-modifying materials are periodically or continuously entrained in the gas to either shorten, lengthen, sustain or suppress the arc of the electrode. This stream of material also counteracts the updraft which normally prevails in hollow electrodes, and reduces considerably the electrode consumption.

The gas to be used in the practice of the invention should be one which, during its period of application, is substantially non-reactive with the carbon electrode or the furnace lining material, and which does not produce undesirable side reactions in the furnace. Argon is an illustration of a preferred gas. Examples of other desirable gases are helium and neon.

The arc-modifying material may be one which will either raise or lower the conductivity of the arc according to whether the arc length is to be lengthened or shortened respectively. In the initial melt-down of a metal charge, it is desirable to use a long arc having a high power capacity so that a maximum amount of heat can be supplied at a constant rate, and thus increase the efficiency of the furnace. Materials that have been found to be admirably suited in enhancing or lengthening the arc length are an inert gas such as argon, or a carrier gas such as argon or nitrogen for calcium fluoride or sand and limestone.

When a shorter arc length is desired either in the melt-down or refining period, the arc length may be suitably shortened by entraining in the inert carrier gas an arc suppressing solid such as boric acid or gaseous material, such as steam, ammonia or manufactured gas.

It is to be understood that this invention is not limited to the above-listed carrier gases and arc-modifying materials, and that the choice of gas and arc-modifying material is determined by the desired operating conditions and chemistry in the furnace. In cases of metals other than steel, other gases or arc-modifying materials may be used, depending upon the nature of the chemistry it is desired to accomplish.

In accordance with the method of the invention, substantial improvement in the productivity of a hollow electrode furnace is effected by employing an arc stabilizing gas in the bore of the furnace electrode during the erratic melt-down period and continuing to supply said gas to shorten the refining period. During the refining period, control over the stability of the arc is not as important as during the melt-down period, since less power is required, and the arc is less erratic due to the stabilizing effect of the slag layer. The stream of gas material leaving the bore of the furnace electrode impinges directly upon the surface of the melt, and its velocity produces a stirring or agitating effect in the melt region under the electrode, thereby shortening the reaction time between the melt ingredients and the slag, such as in the case of steel melting, and considerably shortening the refinement period. Further stimulation of the melt may be effected by feeding the bore material in spurts, or in the case where more than one electrode is utilized in a hollow electrode furnace, by alternating the flow of bore material between the electrodes.

While I do not wish to be bound by any particular theory, I believe the reason for the unexpectedly shortened refining period resides primarily in the varying or ambient local pressure condition created in the arcing zone by the flow of bore material, as well as by the arc itself. The combination of these two effects causes a hydrostatic unbalance, which in turn agitates and stirs the melt.

An important advantage of the present invention is that it offers a simple and rapid method of minimizing the hydrogen content of a metal bath. In the case of molten steel in electric-arc furnaces, the removal of hydrogen has heretofore been carried out by flushing or purging the steel with a dry gas such as nitrogen, argon or substantially moisture-free air. The flushing gas is either applied over the entire slag during the refining period or blown into the melt with a lance immediately prior to tapping. The effectiveness of hydrogen removal can be rapidly determined by pouring an ingot mold. The presence of too much hydrogen in the metal, usually referred to as "hydrogen wildness" or "hydrogen back-up," is indicated by a swelling of the ingot, which is an adequate and reliable indication of gassy steel. A usually acceptable amount of hydrogen in the ingot is indicated by the formation of a normal ingot shrinkage cavity as the ingot cools. If hydrogen back-up is indicated, an additional flushing is given, followed by an ingot mold test. This is continued until the test ingots no longer indicate undesirable amounts of hydrogen.

From representative tests, it has been ascertained that the lowest concentration of hydrogen occurs during the carbon oxidizing or decarbonization period of the melt. At later stages the hydrogen values increase, the highest concentration occurring immediately following the refining period during the time alloy additions are about to be or are being made. When argon was not supplied through the hollow electrode, particularly during periods of high humidity, hydrogen back-up usually occurred in the test ingots. This required the use of purge argon until a normal test ingot was obtained. In contrast, as will be shown later, the incidence of hydrogen back-up in steel melts produced in accordance with the invention was sharply reduced.

As compared with present standard hydrogen purging methods, the introduction of argon through the bore of a hollow electrode in conventional arc furnaces in accordance with the invention does not substantially affect the hydrogen already in the steel, but tends to prevent the pickup of hydrogen from atmospheric moisture by providing a dry inert gas at the hottest spot in the furnace—namely the arc. An obvious advantage is that it is possible to use electrode argon on a continuous basis without encountering hydrogen backup, thereby virtually eliminating the need for utilizing purge argon which, during periods of high absolute humidity, is frequently used in excessive amounts.

The mechanism of reduction in hydrogen pickup accompanying the use of electrode argon is not entirely understood. My data shows that the hydrogen content of the electric furnace heats, between the periods of carbon oxidation and tap, is in part dependent upon the atmospheric humidity, the hydrogen being absorbed from the furnace atmosphere if the atmospheric humidity is too high. I believe that the measured hydrogen content is the result of hydrogen being assimilated into the metal from the gas and slag phases; that is, the hydrogen is supplied from the water vapor in the furnace atmosphere to the slag, and from the slag to the liquid steel. By supplying argon through the electrode bore, the moisture in the furnace atmosphere is displaced in the arcing region, which being the hottest part of the furnace is the most likely place for the hydrogen transfer mechanism to occur. An increased rate of argon flow will naturally displace more moisture laden air from the arcing region and consequently will be more likely to prevent the incorporation of hydrogen in the melt.

Atmospheric samples taken at various furnace locations, exclusive of the regions in the immediate vicinity of the arcs, during argon electrode operation indicate that the highest argon concentration occurs over the central portion of the furnace bath, the argon content being about three times that found in atmospheric air. The argon concentration gradually diminishes radially outwardly and drops rapidly near the furnace door to slightly above the normal concentration of argon in air. This reduction in argon concentration can be largely attributed to the draft in the furnace due to air infiltration through the furnace door. Clearly, an improved furnace seal will produce a more effective argon blanketing effect, thereby further enhancing the quality of the furnace product.

Another possible explanation is that the method of the present invention provides a conductive stream of dry gas in such a manner about the arc tip that moisture laden atmosphere is excluded from the arcing zone. This virtually eliminates the possibilty for water vapor to be dissociated by the arc. In this manner, metal vapors which are also present in the arc zone will not combine or react with moisture in the furnace atmosphere. In effect, the argon provides a local blanket over a crucial zone in the electric arc furnace where it is believed most of the water vapor is dissociated and the resulting hydrogen is assimilated into the melt. From a practical viewpoint this means that a prevention in hydrogen pickup can be largely avoided with a relatively small quantity of argon.

As an illustration of the method of the invention, referring to the Fig. 1, a graphite electrode 10 is provided with a longitudinal bore 12. The electrode 10 may be in one piece, or may consist of a number of pieces joined together, suitably, by a hollow nipple 13. A pressure storage tank or cylinder 14 of more or less conventional construction supplies gas material such as argon, by means of a suitable pipe or gas line 16, having interposed therein a control valve, preferably a solenoid valve 18. For the purpose of adding solid arc-modifying material to the carrier gas, a chamber 20 filled with arc-modifying material communicates with the gas line 16 through a branch line 22, which is connected gas tightly at the outlet 24 of the chamber 20 and the juncture 26 in the gas line 16. The solenoid valve 18 is suitably connected to the electrode bore 12, and operates in conjunction with a control element 28 in the main power circuit. The control element 28 is connected in an electrical circuit (not shown) for controlling the electrode regulation and is governed by the current and/or voltage at the arc tip. The solenoid 18 is pre-set to open when the element 28 records above or below a predetermined current and/or voltage in the electrode arc to allow gaseous argon to be introduced into the electrode bore 12. A valve control 30 may also be provided in the branch line 22 to release solid arc-modifying material if the arc current should fall below a minimum allowable value. Valves 18 and 30 may also be constructed to be manually actuated if and when any part of the device fails to function properly, or when a change in level of operating characteristics is desired.

In order to indicate still more fully the nature of the present invention, the following table is set forth showing comparative results of tests using hollow electrodes for melting and refining metal scrap charges with results of tests using the method of the invention for controlling arc stability. It is to be understood that the data in this table is presented as illustrative only, and is not intended to limit the scope of the invention.

In these tests substantially equal furnace charges of scrap for the production of stainless steel were melted and refined, using a 14 inch hollow graphite electrode having a ¾ inch central bore. The electrode was operated under open arc conditions as a simple hollow electrode with the exception of a brief interval at the latter part of the refining period, when argon was supplied through the bore of the electrode. Further tests were conducted with hollow electrodes and furnace charges substantially identical with the above-described tests except for the full time supply of argon during the melt-down and refinement periods at a flow rate of approximately 30 c.f.h. per electrode. The value of hollow electrode service with argon can be seen in Table I and in the graph shown in Fig. 2.

TABLE I

*Effect of passage or argon gas on performance of hollow electrode*

| | Full Time Supply of Argon | No Argon Supplied During Melt-Down | Improvement of Full Time Argon Over Part Time Argon |
|---|---|---|---|
| Total Heat: | | | *Percent* |
|  Time Required, minutes | 314.8 | 358.1 | [1] 12.1 |
|  Furnace productivity, tons/hour | 2.676 | 2.55 | 8.4 |
| Melt-Down Period: | | | |
|  Energy Input, kw. hrs./Ton poured | 4,970 | 5,050 | [2] 1.6 |
|  Time for melt-down, minutes | 89.5 | 105.5 | 15.2 |
|  Average Power level during Power-On Time, kw | 4,270 | 3,840 | 11.2 |
|  Melting Rate, tons/hour | 8.43 | 7.45 | 13.2 |
| Refining Period: | | | |
|  Energy Input, kw. hrs./Ton poured | 2,680 | 3,070 | [3] 12.7 |
|  Time for Refining, minutes | 180.3 | 207.6 | 13.1 |
|  Average Power level during: | | | |
|   1. Power on Time, kw | 1,423 | 2,020 | 29.5 |
|   2. Total Refining Time, kw | 892 | 890 | |

[1] Actual Saving—43.3 minuts.
[2] Actual Saving—80 kw. hrs./ton poured.
[3] Actual Saving—390 kw. hrs./ton poured.

From the above results it will be seen that compared with a simple hollow electrode the use of argon in the bore of a hollow electrode requires less heating time for melting down and refining a charge of metal, and offers substantial operating time savings. Referring to Table I the 43.3 minutes total saving in time for the heat tested in the practice of the present invention is significant because it makes possible the production of up to approximately 8.4 percent more steel from substantially the same equipment. Conversely, smaller and less expensive equipment operated in accordance with the principles of the present invention may be used to produce the same amount of steel as larger, conventional equipment operating according to standard practice. Used in conjunction with an electrical control circuit the method of the invention provides automatic control of the arc voltage. It was observed that during the most erratic arcing period at the beginning of the melt-down period, argon improved the steadiness of the arc, thus permitting the delivery of a higher rate of power. At the end of the melt-down period, and during refining it was noticed that a much more stable arc was produced, and more easily focused under the electrode tip.

Figure 2:
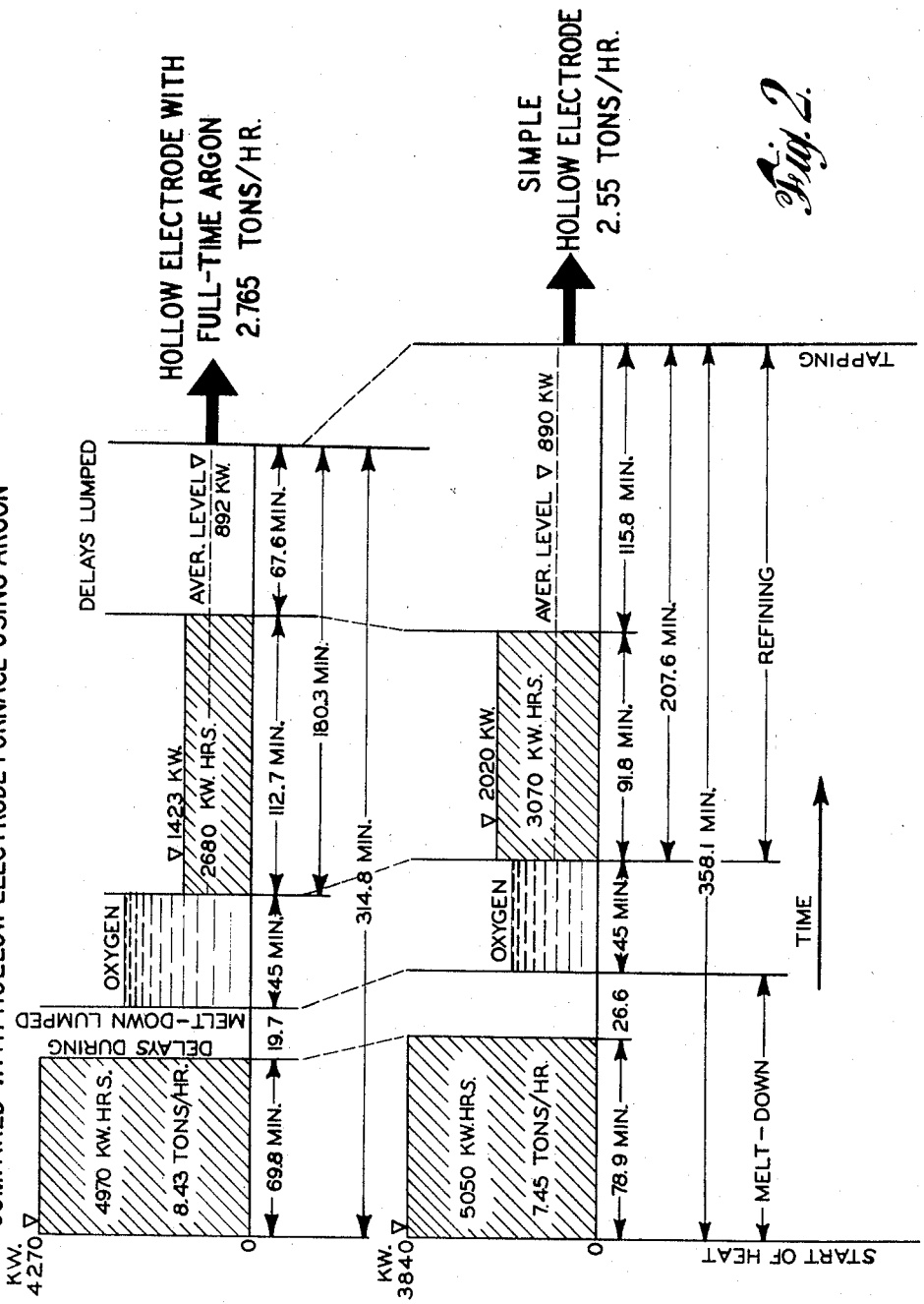
Fig. 2 is a graphical illustration of the performance of an electric arc furnace, confirming the benefits of the present invention.

Referring to Fig. 2, the results of the data shown in Table I for the simple hollow electrode furnace and the hollow electrode furnace using argon are graphically compared. It will be seen that while the useful melt-down period for electrode argon practice is considerably shorter than simple hollow electrode practice (69.8 minutes, as against 78.9), the former is capable of melting more tons per hour (8.43 tons/hr. vs. 7.4 tons/hr.) because of the higher level of energy with which it can be supplied (4270 kw. vs. 3840 kw.). On the other hand, during the useful refining period, the electrode argon uses a lower level of energy over a longer period of time. However, the useful energy expended for refining 8.43 tons/hr. with an argon electrode is substantially less than the useful energy required to refine only 7.45 tons/hr. with a simple hollow electrode (2680 kw.-hrs. vs. 3070 kw.-hrs.).

To further illustrate the value of the present invention in improving the quality of electric furnace product, a series of heats were conducted in one furnace using standard purging techniques and in a second furnace using electrode argon according to the method of the invention. Table II indicates the incidence of unfavorable hydrogen back-up in these furnaces at various humidities.

TABLE II

| Absolute Humidity, Grams $H_2O$/lb. of Dry Air | Standard Practice Heats | | Electrode Argon Heats | |
| --- | --- | --- | --- | --- |
| | No. of Heats | No. of $H_2$ Backups before purge | No. of Heats | No. of $H_2$ Backups before purge |
| Under 40 | 0 | 0 | 0 | 0 |
| 40–49 | 3 | 0 | 5 | 0 |
| 50–59 | 9 | 0 | 10 | 0 |
| 60–69 | 4 | 0 | 4 | 0 |
| 70–79 | 5 | 0 | 6 | 2 |
| 80–89 | 7 | 3 | 8 | 1 |
| 90–99 | 19 | 8 | 19 | 2 |
| 100–109 | 14 | 7 | 13 | 2 |
| 110–119 | 2 | 0 | 3 | 0 |
| 120–129 | 4 | 4 | 3 | 0 |
| 130–139 | 1 | 1 | 1 | 0 |
| Over 139 | 0 | 0 | 0 | 0 |

From the results shown in Table II it will be seen that in general, as the humidity rises, the frequency of hydrogen back-up increases in heats made without electrode argon and according to conventional methods. Heats carried out in accordance with the electrode argon method of the invention gave improved control over hydrogen content, particularly during periods of high humidity.

An important advantage of the present invention is that it overcomes the limitations of the aforementioned patent to H. V. Johnson, 2,744,945, wherein the electrode diaphragm prevented the passage of arc-modifying materials through the hollow of the electrode. In effect, the passage of gaseous or gaseous and solid arc-modifying materials through the hollow electrode passage improves arc stability, increases the furnace productivity and serves as an ideal method by which materials may be introduced into a crucial portion of the furnace in order to control the quality of the furnace product.

It will be understood that modifications and variations, such as introducing into the bore of the electrode several materials, either singly or combined, to achieve a desired effect in a single heat, may be effected without departing from the spirit and scope of the novel concepts of the present invention.

What is claimed is:

1. In the manufacture of electric-arc furnace steel wherein a carbonaceous electrode having a longitudinal bore is utilized in fusing, melting and refining a charge of metal, and an arc is struck between said electrode and said charge, the improvement of maintaining optimum power under the normally prevalent erratic conditions in said furnace, said improvement comprising introducing into said bore an arc-sustaining material when said arc is too long in order to prevent arc extinction and maintain optimum power, and an arc-suppressing material when said arc is too short to maintain optimum power.

2. In the manufacture of steel wherein a carbonaceous electrode having a longitudinal bore is utilized in fusing and melting a metal charge, the improvement of substantially reducing the heating period of said charge, said improvement comprising striking an arc between said electrode and said charge, and stabilizing said arc by introducing arc supporting and arc suppressing material in said bore during the melt-down period to suitably correctively lengthen and shorten said arc, respectively.

3. In the manufacture of steel wherein a carbonaceous electrode having a longitudinal bore is utilized in fusing and melting a metal charge, the improvement of substantially reducing the heating period of said charge, said improvement comprising striking an arc between said electrode and said charge, and stabilizing said arc by introducing argon and ammonia in said bore during the melt-down period to suitably correctively lengthen and shorten said arc, respectively.

References Cited in the file of this patent
UNITED STATES PATENTS

| | | |
| --- | --- | --- |
| 430,453 | Willson | June 17, 1890 |
| 1,715,155 | Westberg | May 28, 1929 |
| 2,303,973 | Armstrong | Dec. 1, 1942 |
| 2,665,982 | Crego et al. | Jan. 12, 1954 |
| 2,702,239 | Gilbert et al. | Feb. 15, 1955 |

OTHER REFERENCES

Symposium on Titanium, Office of Naval Research, Dec. 16, 1948, page 78.

Fontana: Air Force Technical Report No. 5946, Titanium-Chromium Binary Alloys, 1950, page 14.

UNITED STATES PATENT OFFICE

CERTIFICATE OF CORRECTION

Patent No. 2,909,422                  October 20, 1959

William E. Schwabe

It is hereby certified that error appears in the above numbered patent requiring correction and that the said Letters Patent should read as corrected below.

In the heading to the drawings, Sheets 1 and 2, lines 2 and 3, and in the heading to the printed specification, lines 2, 3 and 4, title of invention, for "METHOD OF IMPROVING THE QUALITY AND PRODUCTIVITY OF ELECTRIC ARC FURNACE STEEL" read -- METHOD OF IMPROVING THE QUALITY OF STEEL FROM AND PRODUCTIVITY OF AN ELECTRIC ARC FURNACE --.

Signed and sealed this 2nd day of August 1960.

(SEAL)
Attest:

KARL H. AXLINE
Attesting Officer

ROBERT C. WATSON
Commissioner of Patents